United States Patent [19]

Strong

[11] 4,163,465
[45] Aug. 7, 1979

[54] APPARATUS FOR CUTTING DOVETAIL JOINTS

[76] Inventor: Donald Strong, 33165 Bock, Garden City, Mich. 48135

[21] Appl. No.: 825,300

[22] Filed: Aug. 17, 1977

[51] Int. Cl.² ............................................. B27F 1/04
[52] U.S. Cl. .................................. 144/87; 144/2 R; 144/136 R; 144/326 R; 409/206
[58] Field of Search ..................... 83/508.2; 90/16, 18; 144/2 R, 82, 85, 87, 90 R, 134 R, 136 R, 321, 323, 326 R, 198 R, 203, 133 R

[56] References Cited

U.S. PATENT DOCUMENTS

| 125,282 | 4/1872 | Gear et al. | 144/87 |
|---|---|---|---|
| 2,542,615 | 2/1951 | Balazs | 144/136 R |
| 3,223,132 | 12/1965 | Erne | 144/87 |
| 3,238,980 | 3/1966 | Goldstein | 144/136 X |
| 3,306,324 | 2/1967 | Lillywhite | 144/82 X |
| 3,339,601 | 9/1967 | Christman et al. | 144/82 X |

FOREIGN PATENT DOCUMENTS

| 138885 | 3/1903 | Fed. Rep. of Germany | 144/87 |
|---|---|---|---|
| 300757 | 11/1928 | United Kingdom | 144/87 |

*Primary Examiner*—Robert Louis Spruill
*Assistant Examiner*—W. D. Bray
*Attorney, Agent, or Firm*—Charles W. Chandler

[57] ABSTRACT

A router is mounted on the back of a support plate which can be raised or lowered to a precise adjusted position with respect to a base plate such that a dovetail cutting tool cuts precision dovetail joints in wooden workpieces. Other cutting tools can be employed for rabbeting, mortising, as well as for cutting square and round tenons to produce close fitting wooden joints.

2 Claims, 6 Drawing Figures

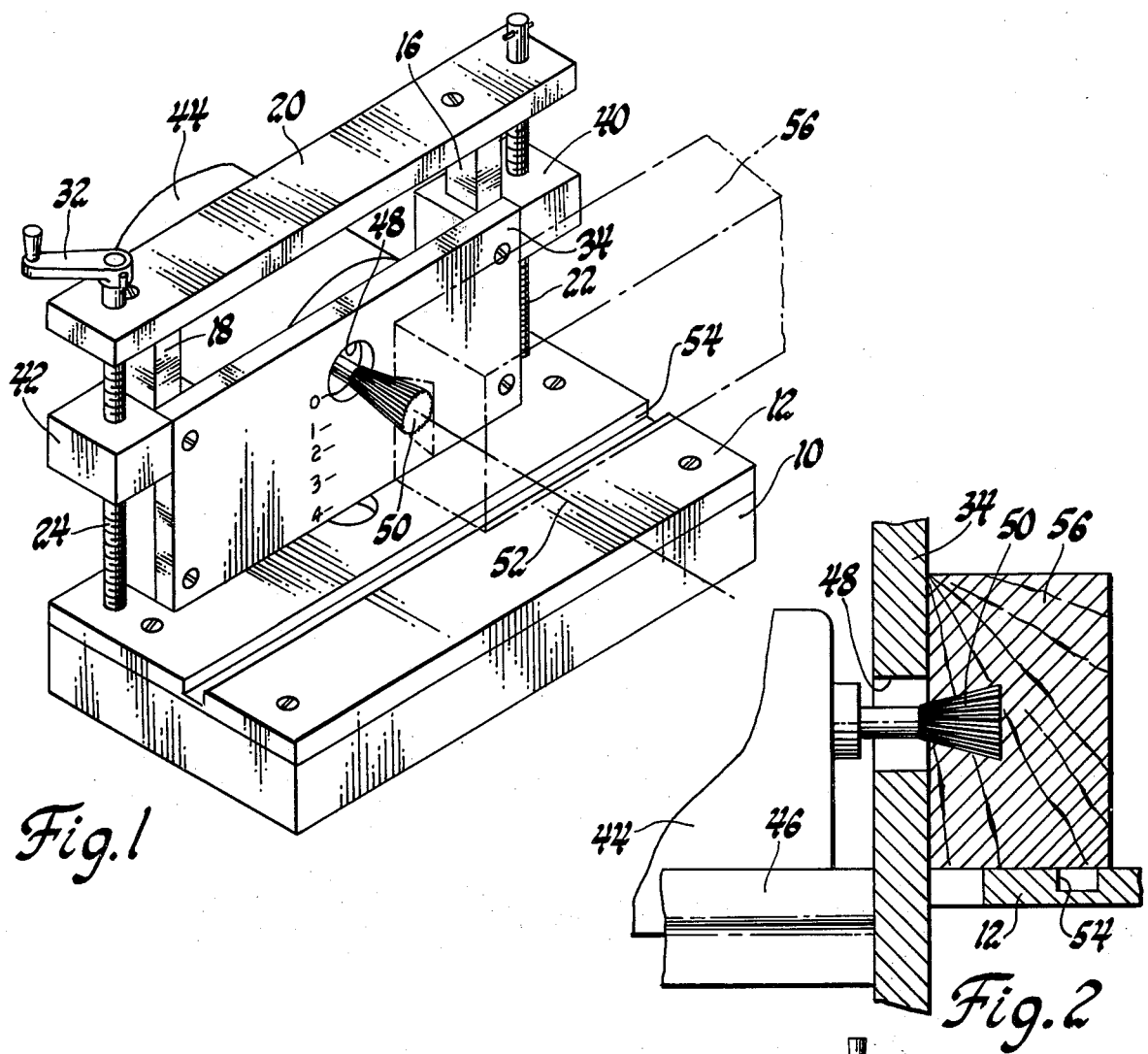
Fig.1
Fig.2
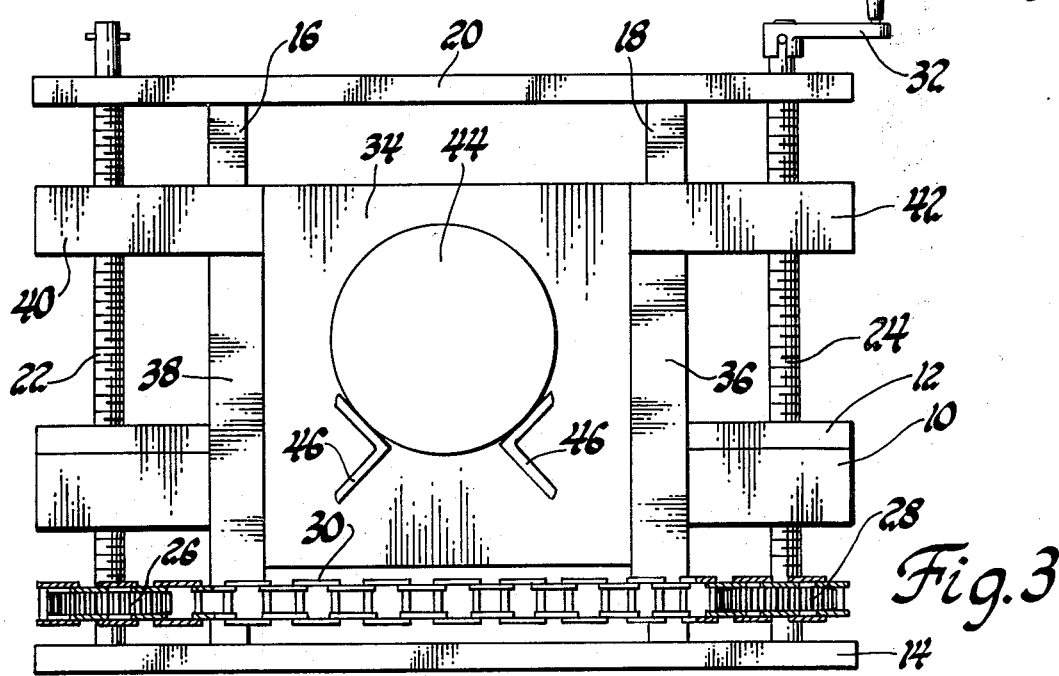
Fig.3

APPARATUS FOR CUTTING DOVETAIL JOINTS

BACKGROUND OF THE INVENTION

This invention relates to means for cutting close-fitting joints in wooden workpieces, and more particularly to apparatus for supporting a router on a support plate for adjustment along a pair of slide bars such that a dovetail cutting tool can be employed for cutting close-fitting dovetail tongue and groove joints.

SUMMARY OF THE INVENTION

The broad purpose of the present invention is to provide a compact, versatile and precision apparatus for supporting a power driven router for vertical adjustment along a pair of slide bars arranged so as to permit a dovetail cutting tool to be precisely located in an adjusted position with respect to a base member on which the wooden workpiece is supported. The preferred embodiment of the invention can employ any of a variety of wood-cutting tools so that the router can be used for cutting precision joints in sash and door stiles, snug-fitting dovetail joints, as well as square and round tenons and the like.

These and other advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a perspective view of apparatus illustrating the preferred embodiment of the invention;

FIG. 2 is a fragmentary view of the embodiment of FIG. 1;

FIG. 3 is a rear view of the embodiment of FIG. 1; and

DESCRIPTION OF THE PREFERRED EMBODIMENT

Figure 4:
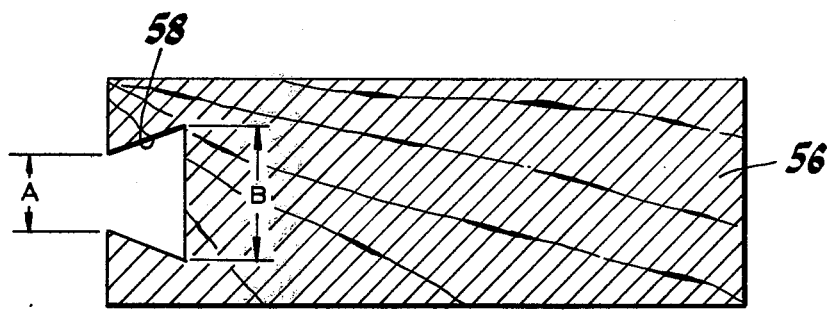
FIGS. 4–6 illustrate the steps in forming a tongue and groove joint using the preferred apparatus.

Referring to the drawing, the preferred dovetail cutting apparatus, illustrated in FIG. 1, comprises a base 10 having a horizontal base plate 12. Referring to FIG. 3, an elongated horizontal lower support 14 is mounted about six inches below base 10.

A pair of elongated, vertical slide members 16 and 18 are mounted in a spaced position on support 14 and are attached to base 10. Slide members 16 and 18 each have a rectangular cross section. An upper support 20 is connected to the upper ends of slide members 16 and 18.

A pair of vertical threaded members 22 and 24 are mounted in vertical positions adjacent slide members 16 and 18, respectively, with the lower ends of the two threaded members being journaled in support 14 and their upper ends being journaled in support 20. A sprocket 26 is carried by threaded member 22 and a second sprocket member 28 is carried by threaded member 24. Chain means 30 connect the two sprockets together such that as threaded member 24 is rotated by the user, threaded member 22 is rotated by chain means 30. A handle 32 is mounted on the upper end of threaded member 24 so that the user can rotate both threaded members together.

A support plate 34 having a channel-shaped section 36 along one edge and similar channel-shaped section 38 along its opposite edge is mounted on slide members 16 and 18, the slide members being received in the channel-shaped sections for supporting the support plate for vertical motion.

A shoulder 40 carried on one side of plate 34, has a threaded opening receiving threaded member 22, and a second shoulder 42, carried on the opposite side of plate 34, has a threaded opening for receiving threaded member 24. The two shoulders 40 and 42 are so connected to the threaded members that as handle 32 is rotated in one direction, the support plate is raised, and as handle 32 is rotated in the opposite direction, the support plate is lowered. The threads on members 20 and 24 are chosen such that one complete rotation of handle 32 lowers the support plate 1/16 of an inch so that the user can obtain a high degree of precision in adjusting the support plate with respect to base plate 12.

An electrically energized router 44 is carried on support means 46 on the backside of plate 34. Support plate 34 has an opening 48 for a rotatable, dovetail cutting tool 50 carried by router 44. Cutting tool 50 extends to a position on the opposite side of plate 34 as router 44, as best shown in FIG. 2.

It is to be noted that support plate 34 forms a right angle corner with respect to base plate 12. Cutting tool 50 is rotatable about an axis 52, as illustrated in FIG. 1. Slide members 16 and 18 and threaded members 22 and 24 cooperate such that the user can either raise or lower the router to precisely locate the cutting tool above base plate 12.

Base plate 12 has miter ways 54 formed parallel to the face of plate 34.

Figure 5:
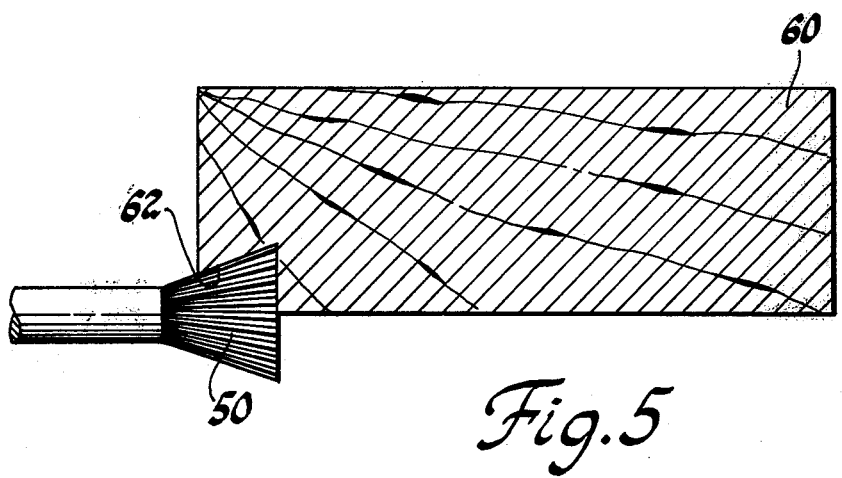
Figure 6:
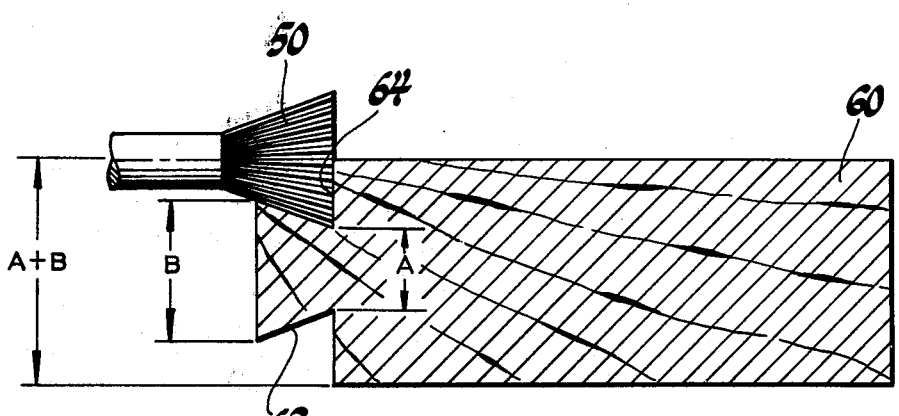

In use, a tongue and groove joint is formed as illustrated in FIGS. 4, 5, and 6. A first workpiece 56, illustrated in FIG. 4, is mountd on base plate 12 and a groove 58 formed by moving the workpiece into cutting engagement with cutting tool 50. It is to be noted that groove 58 has a wide base having a dimension "B" and a narrow opening having a dimension indicated at "A". Because of the tapered configuration of the cutting tool, the dimension "A" of the narrow opening depends upon the depth of the slot in the workpiece.

A second workpiece 60 is then mounted on base plate 12 in contact with support 34. The cutting tool is lowered adjacent the base plate to cut a slot 62 along the lower corner of the workpiece as illustrated in FIG. 5.

Cutting tool 50 is then raised a distance equal to dimension "A" plus dimension "B". The workpiece 60 is then passed in a return stroke to cut a second slot 64 along the upper corner of the workpiece. It is to be noted that slots 62 and 64 cooperate to form a tapered tongue having a greater dimension equal to "B" and a base dimension equal to "A" so that it can then be received in a close-fitting, sliding connection with groove 58.

The preferred cutting apparatus can be employed for cutting other joints by substituting any appropriate tool.

Having described my invention, I claim:

1. Apparatus for forming a dovetail groove in a wooden workpiece comprising:
   a base member;
   a pair of spaced, elongated slide members mounted on the base member;
   a support member mounted between the slide members so as to be slidably movable therealong;

a power driven router mounted on the support member so as to be movable therewith, and a cutting tool carried by the router so as to be rotated in a cutting motion about an axis spaced from the base member;

adjustment means carried on the base member, said adjustment means comprising an elongated rotatably supported threaded member, the support member being connected to the threaded member so as to be moved between adjusted positions with respect to the base member as the threaded member is being rotated; and the support member and the base member being disposed to form a sliding support for a workpiece being moved along a path of motion at right angles to the axis of rotation of the cutting tool such that the cutting tool is operative to cut a dovetail slot in such workpiece.

2. In combination with a power driven routing tool:

base means including a base plate;

a pair of spaced parallel elongated threaded members mounted on the base means in horizontally-spaced positions;

chain and sprocket means connecting the pair of threaded members such that a first of the threaded members is rotated in response to a rotational motion of the other threaded member;

a pair of spaced elongated slide members mounted on the base means in parallel relationship to the threaded members;

support means including a support plate having a cutting tool opening, and a pair of channels disposed on opposite sides of the support plate, each channel slidably receiving a slide member such that the support plate is supported for vertical slidable motion in a position in which the support plate cooperates with the base plate to form a right angle corner for receiving a workpiece for horizontal slidable motion;

means for mounting the routing tool on the support plate so as to be vertically movable therewith;

a cutting tool rotatably carried by the routing tool and received in the cutting tool opening of the support plate so as to be disposed in a cutting position an adjusted distance above the base plate; and means connecting the support means to the threaded members such that as they are rotated in a first direction the support plate is moved in an upward direction and as the threaded members are rotated in the opposite direction, the support plate is moved in a downward direction.

* * * * *